United States Patent [19]

Canonne

[11] 4,133,905
[45] Jan. 9, 1979

[54] PROCESS FOR THE MANUFACTURE OF COOKED SUGAR PASTILLES

[75] Inventor: Jacques E. Canonne, Paris, France

[73] Assignee: Corexi S.A., Luxembourg, Luxembourg

[21] Appl. No.: 843,031

[22] Filed: Oct. 17, 1977

[30] Foreign Application Priority Data

Jun. 24, 1977 [FR] France ............................... 77 19441

[51] Int. Cl.$^2$ ............................................. A23G 3/00
[52] U.S. Cl. ..................................... 426/660; 426/658
[58] Field of Search ................. 426/576, 660, 659, 658

[56] References Cited

U.S. PATENT DOCUMENTS

| 2,188,489 | 1/1940 | Veatch | 426/660 |
| 3,184,315 | 5/1965 | Wolf | 426/660 |
| 3,908,032 | 9/1975 | Didesot et al. | 426/660 |

OTHER PUBLICATIONS

Daniel, Up-To-Date Confectionery, Maclaren & Sons Ltd., Surrey, Eng. 1965, pp. 472–473.

Primary Examiner—Jeanette M. Hunter
Attorney, Agent, or Firm—Browdy and Neimark

[57] ABSTRACT

A mass of cooked sugar, whose temperature is generally comprised between 120° and 150° C (248° and 302° F), is dusted with dextrose which may be flavored and if necessary added with active ingredients. The sugar and dextrose are mixed for a sufficient time. The mass is then divided by suitable means into pastilles which are then precandied by mixing in a turbine with addition of a sugar syrup which may contain gum arabic or gelatin, pre-candying being done in powdered sugar which may be impregnated with aromatic volatile products, active if necessary. The sugar pastilles are then candied in a suitable mixer containing granulated sugar which may also be impregnated with aromatic volatile products and active ingredients if necessary.

10 Claims, No Drawings

PROCESS FOR THE MANUFACTURE OF COOKED SUGAR PASTILLES

There currently exist confectioneries composed of cooked sugar pastilles, but these pastilles present the disadvantage of sticking to each other in the presence of heat, humidity, or both; for this reason, they are marketed in special packages which are either metal boxes, alimentary grade plastic boxes or as individual pastilles, each having an impermeable paper wrapper and all the pastilles being placed in a case or analogue thereof, thus forming the package. It is occasionally necessary to utilize special packages when these confectioneries are destined for exportation to tropical or equatorial countries.

In addition the major inconvenience of these sugar pastilles, often used for therapeutic or paratherapeutic purposes, is that the volatile active ingredients which they may contain are subject to rapid evaporation and eventual disappearance since the sugar does not retain them to a sufficient degree.

The cooked sugar pastilles are thus often replaced by pastilles which are composed of a mixture of sugar and gum arabic, but the cost of these latter pastilles is significantly greater, due to the cost of the gum arabic. This is unfortunate, since a considerable portion of the consumer public prefers the cooked sugar pastilles, especially during hot seasons, since they do not coat the mouth and do not create thirst as do the gum balls.

The gum arabic-sugar pastilles evidently retain their volatile active ingredients to a greater degree, since they are subject to temperatures which are usually lower than 70° C. (158° F.) during their manufacture. Indeed, the fabrication of cooked sugar pastilles involves temperatures of 130°–140° C. (266°–284° F.) which explains the significant loss of the active ingredients during the fabrication of these pastilles. Manufacturers are thus led to employ an excess of volatile products which in certain cases can only be compensated by candying which uses sugar moistened with the volatile substances, with a slight increase of temperature. Actually, the temperature is slightly increased by a steam jet during the candying process and the candied pastilles leave the production line at ambient temperature.

Faced with these problems, whether it be the price of the raw materials or manufacturing problems, one is led to develop a new process for the manufacture of cooked sugar pastilles in which the basic ingredient, the sugar, is much less expensive. This process, enabling satisfactory results to be obtained, especially concerning the shelf life of the pastilles, avoids costly protective packaging and results in a good volatile product content.

After numerous trials, a new process was developed which yields complete satisfaction for simple cooked sugar pastilles as well as for cooked sugar pastilles used as a support for flavored or active products.

According to the invention, a mass of cooked sugar, whose temperature is generally comprised between 120° and 150° C. (248° to 302° F.), is dusted with dextrose which may be flavored and added with active ingredients if necessary, then the sugar and dextrose are mixed for a sufficient time, the mass is then divided by suitable means into pastilles which are then precandied by mixing with a turbine with addition of a sugar syrup which may contain gum arabic or gelatin, precandying being done in powdered sugar which may be impregnated cold with volatile aromatic substances, active if necessary, and the sugar pastilles are finally candied in a suitable mixer, containing granulated sugar which may also be impregnated cold with volatile aromatic products and active ingredients if necessary.

According to another feature of the invention, the flavoring of the dextrose is done in the proportion of 2 to 5% of the total weight of the cooked sugar with the possibility of increasing this dose by 15 to 30% for the aromatic products, in order to compensate for losses occurring during the cycle of operations of the process.

Various other features of the invention are further apparent from the following detailed description.

A preferred operating mode of the invention is given below, as an example.

A mass of cooked sugar, which is placed in a usual apparatus and at a temperature comprised between 120° and 150° C. (248° and 302° F.), in particular between 130° and 140° C. (266° and 284° F.), is dusted with dextrose to which has previously been added an alcoholic solution of the volatile ingredients, and active substances, such as pharmaceutical products and the like.

The evaporation of these volatile ingredients is thus reduced, since they are partially fixed by the dextrose, or at least the dextrose retards their volatilization. The mass of cooked sugar is then divided by any suitable process, by cutting, molding or otherwise, in order to obtain pastilles. A portion of the volatile ingredients has nevertheless disappeared during the manufacture and, in order, on the one hand, to compensate for this loss and, on the other hand, to obtain pastilles which do not stick together, being protected against heat and humidity, a precandying is first performed, followed by a candying, while each time using impregnated sugar. These operations do not lead to significant losses of the volatile products by volatilization, since this time the process occurs at a lower temperature, comprised between 60° and 80° C. (140° and 176° F.), for example, and more specifically about 70° C. (158° F.).

This process enables the determination by analysis of the excess dose which will thus be well defined for industrial manufacture.

PRECANDYING

When the flavored, cooked sugar pastilles are ready, they are processed in a candying turbine by adding a small amount of sugar syrup or of a syrup containing gum arabic or gelatin, previously boiled for several instants, in order to coat or varnish the pastilles with this hot syrup. A certain quantity of powdered sugar, previously cold impregnated with volatile ingredients, is then added to the turbine, which continues to rotate for several minutes; precandying is thus obtained.

CANDYING

When proceeding to candying, the precandied sugar pastilles are introduced into a mixing station, called a "candisette," where they are exposed to a steam jet and are then stirred in a recipient containing granulated sugar previously flavored or charged with the active ingredients in question, this process occurring at ambient temperature, i.e. generally at a temperature comprised between 15° and 30° C. (59° and 86° F.).

When candying is finished, the pastilles are removed and counted, usually by weighing, and are then packed.

The flavoring of the dextrose used during the preparation of the mass of cooked sugar is generally 2 to 5% of the total weight of the cooked sugar, with the possibility of increasing this amount by 15 to 30% in order to compensate for the losses occurring during the operations of the process described herein. The same proportions may also be used for the flavoring of the powdered sugar used during precandying and that of the granulated sugar utilized during candying.

Following the precandying and candying, cooked sugar pastilles are obtained which cannot stick together and which are satisfactorily impregnated with volatile products. Actually, the manufacturing process according to the invention avoids the losses which normally occur by volatilization during the manufacture of cooked sugar pastilles. In addition, the excess doses which normally represent costly losses of volatile products are partially avoided.

The invention is not limited to the embodiment which is described herein in detail, since various modifications may be applied thereto without departing from its scope as shown by the appended claims.

I claim:

1. A process of manufacturing sugar pastilles comprising dusting a mass of cooked sugar with dextrose, said mass of cooked sugar having a temperature of between 120° and 150° C., mixing the sugar and dextrose, dividing the mixture into pastilles, precandying the pastilles by mixing in a turbine with a sugar syrup and then with powdered sugar, and candying the sugar pastilles with granulated sugar.

2. A process as claimed in claim 1, wherein the dextrose is flavored in the proportion of 2 to 5% of the total weight of the cooked sugar.

3. A process as claimed in claim 1, wherein, during candying, the sugar syrup contains gum arabic and has been previously boiled for several instants in order to varnish the pastilles with the hot syrup.

4. A process as claimed in claim 1, wherein the powdered sugar, used during the precandying is cold impregnated with a volatile aromatic product.

5. A process as claimed in claim 1, wherein the precandying is carried out for several minutes.

6. A process as claimed in claim 1, wherein candying is done in a mixer which contains, in addition to the precandied sugar pastilles, crystallized sugar containing a volatile aromatic product, said candying taking place at ambient temperature, generally between 15° and 30° C.

7. A process in accordance with claim 1, wherein said dextrose contains flavoring agents.

8. A process in accordance with claim 7, wherein said sugar syrup contains gum arabic or gelatin, and said powdered sugar is cold impregnated with a volatile aromatic product.

9. A process in accordance with claim 7, wherein said granulated sugar is cold impregnated with a volatile aromatic ingredient.

10. A process in accordance with claim 7, wherein said cooked sugar has been pre-mixed with a 15-30% excess of volatile aromatic product.

* * * * *